US011807353B2

(12) United States Patent
Best et al.

(10) Patent No.: US 11,807,353 B2
(45) Date of Patent: Nov. 7, 2023

(54) HYPERSONIC AIRCRAFT WINDOW SYSTEM

(71) Applicant: The Boeing Company, Chicago, IL (US)

(72) Inventors: Michael John Best, Redondo Beach, CA (US); Sangvavann Heng, Buena Park, CA (US); Tai Anh Lam, Renton, WA (US); Peter Shaw, Artesia, CA (US); Jonathan David Embler, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 9 days.

(21) Appl. No.: 17/649,563

(22) Filed: Feb. 1, 2022

(65) Prior Publication Data

US 2023/0242236 A1 Aug. 3, 2023

(51) Int. Cl.
*B64C 1/14* (2006.01)
*B64C 1/40* (2006.01)
*B64C 30/00* (2006.01)

(52) U.S. Cl.
CPC .......... *B64C 1/1492* (2013.01); *B64C 1/1484* (2013.01); *B64C 1/40* (2013.01); *B64C 30/00* (2013.01)

(58) Field of Classification Search
CPC ....... B64C 1/40; B64C 1/1484; B64C 1/1492; B64C 30/00; B64C 1/403
USPC ...................................................... 244/129.3
See application file for complete search history.

(56) References Cited

U.S. PATENT DOCUMENTS

| 4,516,815 | A | * | 5/1985 | Venable | ............ | H01R 13/7197 |
| | | | | | | 439/95 |
| 6,131,396 | A | * | 10/2000 | Duerr | ..................... | H01Q 1/364 |
| | | | | | | 62/DIG. 13 |
| 7,002,139 | B2 | * | 2/2006 | Stallard | ............ | H01L 31/02325 |
| | | | | | | 359/512 |
| 8,378,904 | B1 | * | 2/2013 | Colich | ..................... | H01Q 1/02 |
| | | | | | | 343/705 |
| 9,016,629 | B1 | * | 4/2015 | Svartstrom | ............. | B64G 1/52 |
| | | | | | | 244/171.7 |
| 2010/0209679 | A1 | * | 8/2010 | Tompkins | ................. | B64C 1/40 |
| | | | | | | 428/220 |

(Continued)

OTHER PUBLICATIONS

Parveez B, Kittur MI, Badruddin IA, Kamangar S, Hussien M, Umarfarooq MA. Scientific Advancements in Composite Materials for Aircraft Applications: A Review. Polymers (Basel). Nov. 1, 20228, pp. 10-19 (Year: 2022).*

*Primary Examiner* — Tien Q Dinh
*Assistant Examiner* — Katherine June Bolek
(74) *Attorney, Agent, or Firm* — Yee & Associates, P.C.

(57) ABSTRACT

A system and method for sending signals at temperatures associated with hypersonic speeds. A window system in a hypersonic aircraft is provided. The window system comprises a transmissive window in an aeroshell of the hypersonic aircraft, a thermal seal, a sensor, and a sensor housing assembly enclosing the sensor. The transmissive window comprises a facesheet and insulating material adjacent to the facesheet. The thermal seal surrounds a perimeter of the facesheet and seals the facesheet to the aeroshell. The window system is radio-frequency transparent at temperatures associated with hypersonic speeds. The window system is configured to operate at an insertion loss of less than one decibel at the hypersonic speeds.

20 Claims, 9 Drawing Sheets

(56) References Cited

U.S. PATENT DOCUMENTS

| | | | |
|---|---|---|---|
| 2016/0368587 A1* | 12/2016 | Apdalhaliem | B64C 1/1484 |
| 2017/0240266 A1* | 8/2017 | Clemen, Jr. | B64C 30/00 |
| 2020/0123845 A1* | 4/2020 | Busscher | B32B 17/10293 |
| 2021/0101687 A1* | 4/2021 | Duarte | H02J 50/20 |
| 2021/0309345 A1* | 10/2021 | Topf | B64C 9/00 |

* cited by examiner

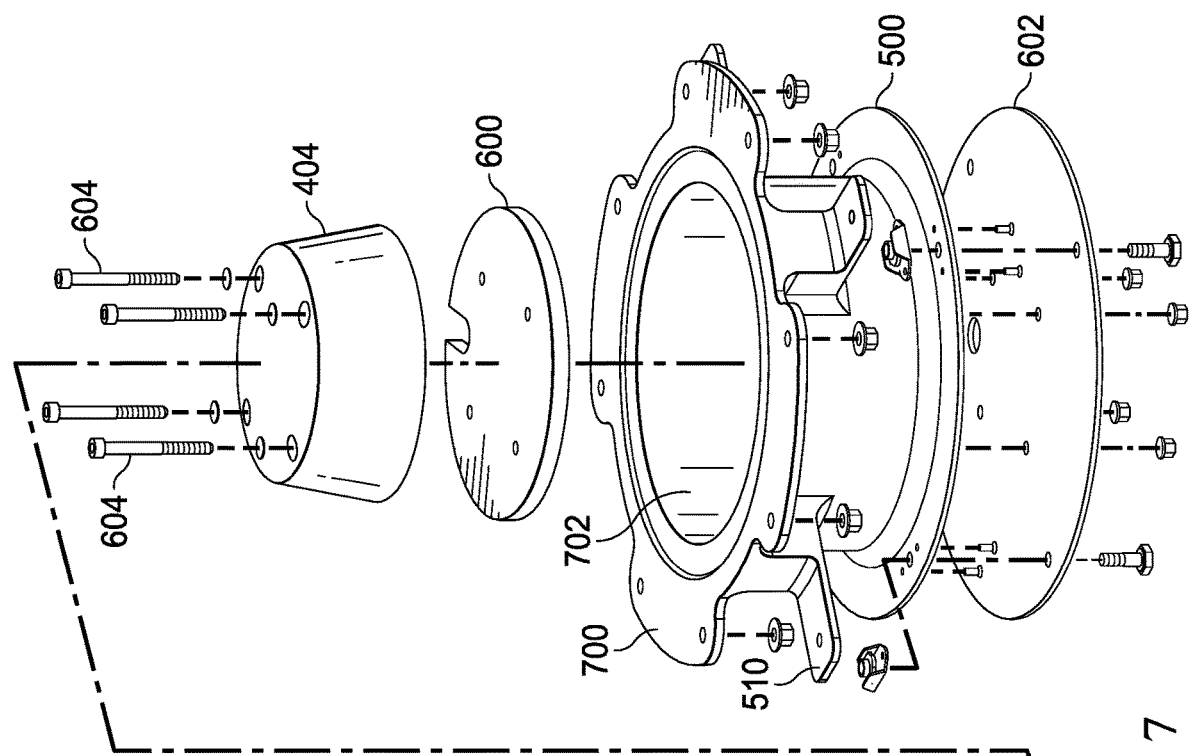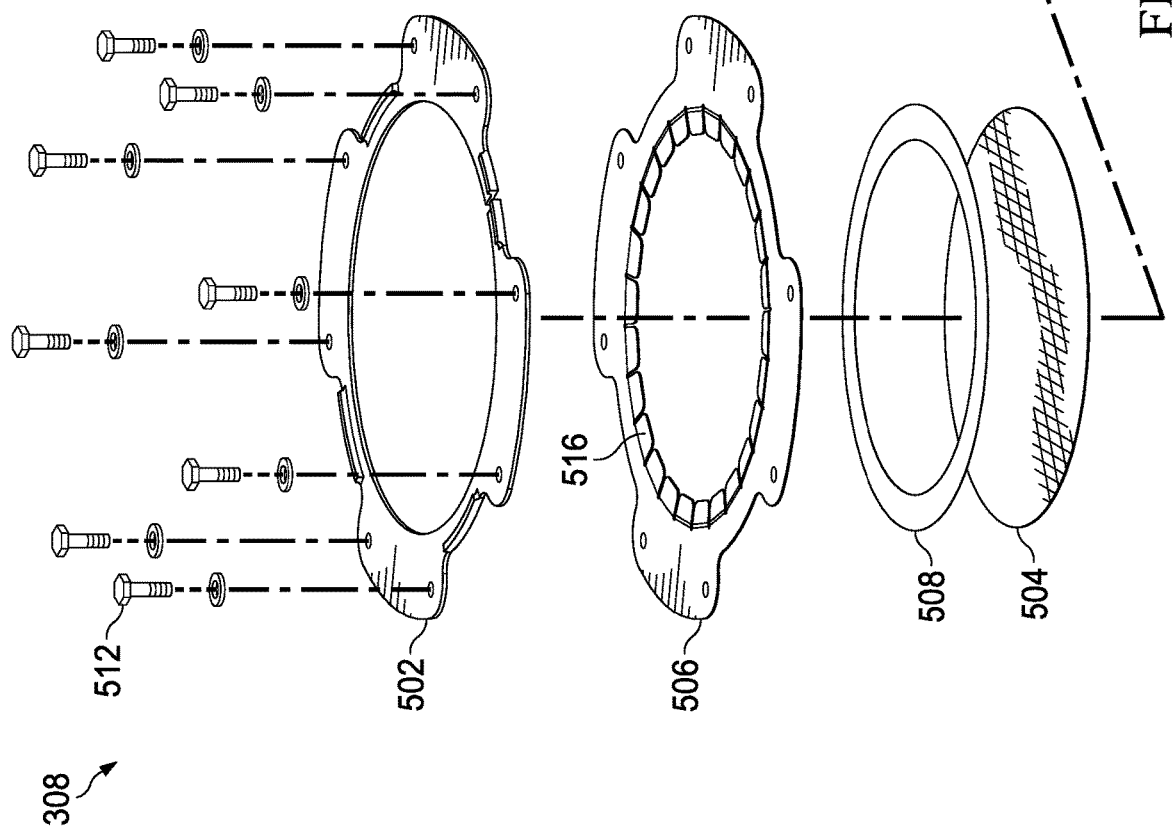
FIG. 7

HYPERSONIC AIRCRAFT WINDOW SYSTEM

GOVERNMENT LICENSING RIGHTS

This invention was made with government support under contract number FA8650-18-C-5281, awarded by the Department of Defense. The government has certain rights in this invention.

BACKGROUND INFORMATION

1. Field

The present disclosure relates generally to aircraft. More specifically, the present disclosure relates to a window system implemented in a hypersonic aircraft.

2. Background

Guidance, navigation, and communication systems in hypersonic vehicles require the ability to transmit and receive signals to operate effectively. Hypersonic flight generates skin temperatures that may exceed 2000 degrees Fahrenheit, thus limiting the types of materials that may be used to manufacture windows for the hypersonic vehicle. Many of these materials are not transparent at RF frequencies. As a result, to transmit and receive signals, a window is required in the hypersonic vehicle. Such windows must comprise a material capable of withstanding hypersonic flight temperatures and aerodynamic loads, while providing insulating capability to protect the underlying sensors and maintaining RF transparency at high temperatures.

Additionally, manufacturers are seeking to improve performance of the guidance, navigation, and communications systems within hypersonic vehicles. Some hypersonic vehicles include filtering devices to improve sensor performance, but the assembly and integration of these devices, as well as associated components, makes installation and repair more complex than desired. Dissimilar coefficients of thermal expansion between the window, sensor assembly, and skin materials also pose challenges. Therefore, it would be desirable to have a method and apparatus that takes into account at least some of the issues discussed above, as well as other possible issues.

SUMMARY

An illustrative embodiment of the present disclosure provides a window system for a hypersonic aircraft. The window system comprises a transmissive window in an aeroshell of the hypersonic aircraft, a thermal seal, a sensor, and a sensor housing assembly enclosing the sensor. The transmissive window comprises a facesheet and insulating material adjacent to the facesheet. The thermal seal surrounds a perimeter of the facesheet and thermally seals an area between the facesheet and the aeroshell. The window system is radio-frequency transparent at temperatures associated with hypersonic speeds. The window system is configured to operate at an insertion loss of less than one decibel at the hypersonic speeds.

Another illustrative embodiment of the present disclosure provides a method for forming a hypersonic aircraft with a window system capable of radio-frequency transparency at temperatures associated with hypersonic speeds. An aeroshell is formed with an opening configured to receive the transmissive window in the window system. The transmissive window has a facesheet co-processed with insulating material. A number of support brackets is fastened to the aeroshell. A thermal seal is positioned around a perimeter of a facesheet in the transmissive window. The transmissive window with the thermal seal is positioned in the opening in the aeroshell. A sensor housing assembly is fastened to the brackets, compressing a thermal barrier between the thermal seal, the opening, and the sensor housing assembly.

A further illustrative embodiment of the present disclosure provides a hypersonic aircraft comprising an aeroshell and a window system. The window system comprises a transmissive window configured to be positioned in an opening in the aeroshell, a thermal seal, a sensor, and a sensor housing enclosing the sensor. The transmissive window has a facesheet and insulating material adjacent to the facesheet. The thermal seal surrounds the perimeter of the facesheet and seals the facesheet to the aeroshell. The transmissive window is configured to operate at an insertion loss of less than one decibel at temperatures associated with hypersonic speeds.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of an exploded view of a sensor housing assembly for a hypersonic aircraft in accordance with an illustrative embodiment;

DETAILED DESCRIPTION

Figure 1:
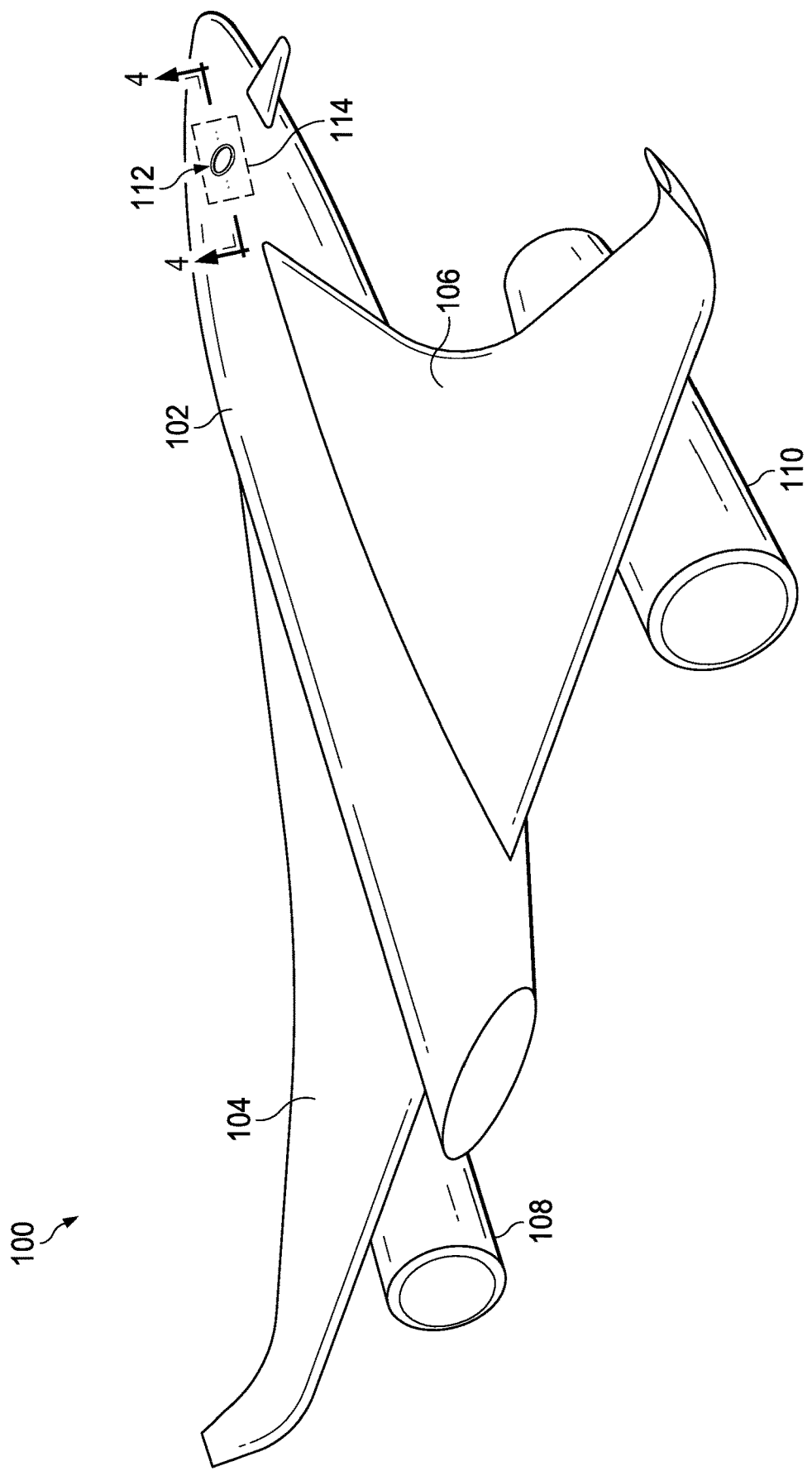
FIG. 1 is an illustration of a hypersonic aircraft in accordance with an illustrative embodiment.

The illustrative embodiments recognize and take into account one or more different considerations regarding signal transmission during hypersonic flight. Hypersonic aeroshells are not radio-frequency transmissive, so windows must be used. Many materials currently used for windows in the aeroshell do not perform as desired at temperatures associated with hypersonic speeds. For example, the illustrative embodiments recognize and take into account that few solutions exist that manage dissimilar coefficients of thermal expansion between the window, sensor housing assembly, and aeroshell materials while providing structural integrity within desired tolerances in a hypersonic flight environment.

The illustrative embodiments further recognize and take into account that attachment of radio-frequency transparent structures is complex and may pose challenges. Some contemplated solutions include directly fastening or bonding the RF-transparent window to the vehicle aeroshell. The drawback of this approach is that it does not allow for independent thermal growth of the aeroshell, sensor housing, and window. Thus, fastening or bonding requires the thermal expansion of the window material be similar to that of the aeroshell to avoid high thermal stresses leading to structural failure. Such constraints limit the design options for aeroshell and window materials, and may limit performance of the overall vehicle if skin temperature limits are imposed.

The illustrative embodiments also recognize and take into account that bonded approaches make replacement, repair, and inspection challenging since bonded joints cannot be disassembled. Bonded approaches also do not provide a means for integrating a sensor and filter with the window and aeroshell, which can complicate vehicle assembly or adversely affect sensor performance more than desired.

Still other solutions for RF-transparent, high-temperature windows may include glass or quartz and polysiloxane or polyimide composite structures. The drawback of these materials is that they are limited to peak use temperatures of 750 degrees Fahrenheit, which precludes their applicability to hypersonic systems. Higher temperature material options, including for example, without limitation, Silicon Nitride and oxide CMC laminate, may also be considered, but these approaches do not provide integrated insulation for internal components. The lack of insulating material can result in sensor or filter components exceeding rating temperatures.

Thus, the disclosed embodiments provide a system and method for transmitting and receiving signals at temperatures associated with hypersonic speeds that maintains structural integrity, allows independent thermal expansion of system components, and provides a desired level of performance of system sensors. A window system for a hypersonic aircraft is disclosed. The window system comprises a transmissive window in an aeroshell of the hypersonic aircraft having a facesheet co-processed with insulating material, a thermal seal, a sensor, and a sensor housing assembly enclosing the sensor. The thermal seal surrounds a perimeter of the facesheet and seals the facesheet to the aeroshell. The transmissive window is radio-frequency transparent at temperatures associated with hypersonic speeds. The transmissive window is configured to operate at an insertion loss of less than one decibel at temperatures exceeding 2000 degrees Fahrenheit.

With reference now to the figures and, in particular, with reference to FIG. 1, an illustration of a hypersonic aircraft is depicted in accordance with an illustrative embodiment. FIG. 1 depicts hypersonic aircraft 100 with aeroshell 102, wing 104 and wing 106. Engine 108 is associated with wing 104 and engine 110 is associated with wing 106.

Aeroshell 102 comprises a composite material in this illustrative example. Window system 112 is integrated within section 114 of aeroshell 102 of hypersonic aircraft 100. A similarly situated window system may be present on the opposite side of aeroshell 102 (not shown in this view) in some illustrative examples. Additional window systems also may be present. Guidance, communication, and navigation signals may be transmitted and received by hypersonic aircraft 100 using window system 112.

In alternative implementations of an illustrative embodiment, additional stabilizers, flaps, engines, or other aerodynamic components may be present. The illustration of hypersonic aircraft 100 is just an example of one implementation for a hypersonic vehicle where an illustrative embodiment may be implemented.

Figure 2:
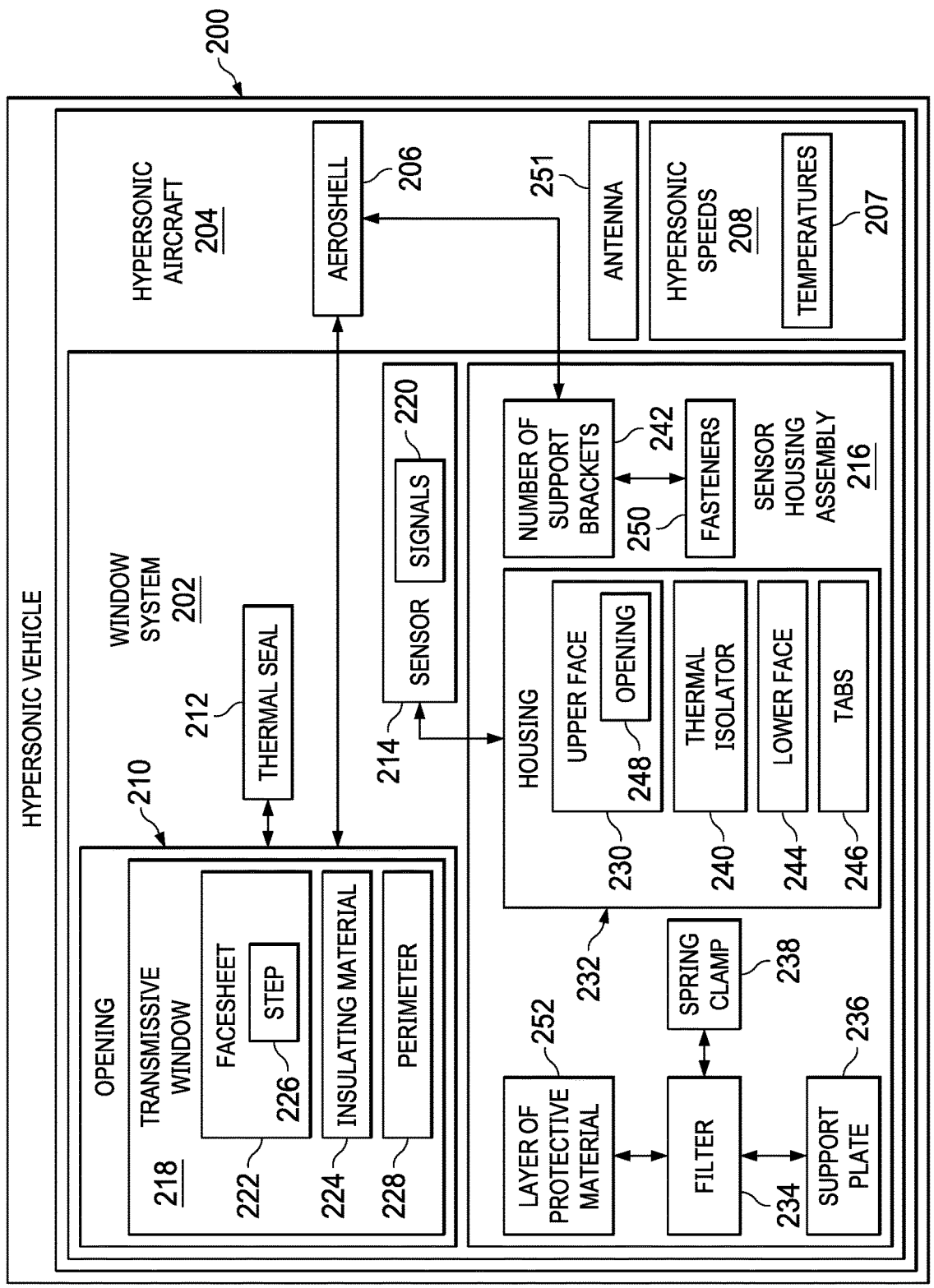
FIG. 2 is an illustration of a block diagram of a hypersonic vehicle in accordance with an illustrative embodiment.

Turning now to FIG. 2, an illustration of a block diagram of a hypersonic vehicle is depicted in accordance with an illustrative embodiment. Hypersonic vehicle 200 is a platform where window system 202 may be implemented. Window system 112 from FIG. 1 may be a physical implementation of window system 202 shown in block form in this figure.

Hypersonic vehicle 200 takes the form of hypersonic aircraft 204 with aeroshell 206 in this illustrative example. Aeroshell 206 comprises composite material and is configured to operate with a desired level of performance at temperatures 207 associated with hypersonic speeds 208. For example, without limitation, aeroshell 206 may be comprised of a non-oxide ceramic matrix composite (CMC) material such as carbon-carbon, carbon-silicon carbide, or some other suitable material. Temperatures 207 may be, for example, without limitation, a skin temperature in excess of 2000 degrees Fahrenheit. More specifically, temperatures 207 may be in range of 2000 degrees Fahrenheit to 2500 degrees Fahrenheit or greater.

As illustrated, aeroshell 206 has opening 210. Opening 210 is a hole in aeroshell 206 configured to receive components in window system 202. Window system 202 comprises thermal seal 212, sensor 214, sensor housing assembly 216, and transmissive window 218. Window system 202 is configured to be positioned in opening 210 in aeroshell 206.

Transmissive window 218 comprises facesheet 222 and insulating material 224. In other words, facesheet 222 and insulating material 224 are configured to allow signals 220 to be sent and received by sensor 214 at a desired level of performance. For example, without limitation, transmissive window 218 is configured to operate at an insertion loss of less than one decibel across frequency ranges from 0-40 GHz, with a dielectric constant of 5 or less and with a tangent loss of less than 0.01 at temperatures 207. Thus, transmissive window 218 and window system 202 are effectively radio-frequency transparent at temperatures 207.

Facesheet 222 is received by opening 210 in aeroshell 206 and faces external to hypersonic aircraft 204. In other words, facesheet 222 is an outer face sheet in this illustrative example and is coincident with the outer mold line (OML) of hypersonic aircraft 204. Facesheet 222 may comprise a radio-frequency transparent oxide ceramic matrix composite material co-processed with low-density ceramic material (insulating material 224). Facesheet 222 is configured to provide window system 202 with strength, durability, and shape stability within desired tolerances in hypersonic environments.

As depicted, insulating material 224 is adjacent to facesheet 222 and internal to opening 210. Insulating material 224 may be comprised of a material selected from at least one of low-density ceramic tile, quartz, or fiberglass fabric and alumina batting, silica fibrous batting, and other suitable materials. Insulating material 224 may be completely incapsulated in the same material used for facesheet 222, sandwiched between facesheet 222 and an inner facesheet, or arranged in some other fashion.

As used herein, the phrase "at least one of," when used with a list of items, means different combinations of one or more of the listed items may be used, and only one of each item in the list may be needed. In other words, "at least one of" means any combination of items and number of items may be used from the list, but not all the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Facesheet 222 and insulating material 224 may be circular and designed to follow the curvature of aeroshell 206. However, such components may take other shapes, depending on the implementation.

In this illustrative example, step 226 exists between facesheet 222 and insulating material 224 in transmissive window 218. Step 226 is a raised segment that allows the components to fit through opening 210 in aeroshell 206.

Thermal seal 212 surrounds perimeter 228 of facesheet 222 that interfaces with aeroshell 206. Thermal seal 212 is configured to thermally seal facesheet 222 to aeroshell 206. Thermal seal 212 may comprise an aluminum batting wrapped in ceramic fabric in this illustrative example. In other illustrative examples, thermal seal 212 may comprise a number of other materials, depending on the functionality of hypersonic aircraft 204. Thermal seal 212 is configured to prevent hot gas flow from entering the hypersonic vehicle 200 while maintaining desired compliance to compress to thermal expansion of the components.

In this depicted example, facesheet 222 is not rigidly attached to aeroshell 206. Rather, facesheet 222 and insulating material 224 are supported by sensor housing assembly 216. Specifically, insulating material 224 is supported by upper face 230 of sensor housing assembly 216. Such design mitigates the thermal-structural stresses that may result from differentials in thermal expansion of the components in window system 202.

Sensor housing assembly 216 encloses sensor 214. Sensor 214 may be any type of sensor suitable for guidance, communication, navigation or other processes during operation of hypersonic vehicle 200. For example, without limitation, sensor 214 may be a global positioning system (GPS) unit.

In this illustrative example, sensor housing assembly 216 comprises housing 232, filter 234, support plate 236, spring clamp 238, thermal isolator 240, and number of support brackets 242. Housing 232 is comprised of a metal material such as, for example, without limitation, titanium, aluminum, some other suitable material, or some combination thereof. Housing 232 is a two-piece structure that has upper face 230, lower face 244, and tabs 246.

Upper face 230 of housing 232 has opening 248. Upper face 230 interfaces with insulating material 224 and is secured to aeroshell 206 with number of support brackets 242. "A number of" when used with reference to items means one or more items. Thus, number of support brackets 242 is one or more support brackets.

In this depicted example, number of support brackets 242 may be comprised of the same material as aeroshell 206. Number of support brackets 242 may be fastened to aeroshell 206 using fasteners 250. Fasteners 250 may comprise at least one of a metal material, a ceramic material, or some other suitable type of material. In this illustrative example, fasteners 250 are ceramic fasteners. Number of support brackets 242 is configured to secure housing 232 to aeroshell 206 and also accommodate thermal mismatch of materials in the assembly through bracket flexure.

In other illustrative examples, number of support brackets 242 may be co-processed with aeroshell 206 as integral components. Spring washers also may be included at all fastened joints to prevent pre-load loss from occurring at high temperatures.

Filter 234 is located between insulating material 224 and sensor 214 and is configured to cover external opening 248 of housing 232. Filter 234 is a material configured to filter out spurious RF interference, allowing for uninterrupted operation of antenna 251. Filter 234 may be comprised of any conductive materials such as metal micro-fabricated on top of non-conductive substrate materials such as glass, or other suitable materials.

Filter 234 is held in place by spring clamp 238 and support plate 236. Support plate 236 is a structure attached directly to housing 232. Support plate 236 is configured to support the bottom portion of insulating material 224 in the installed condition. Support plate 236 and spring clamp 238 may be comprised of a metal material selected from at least one of titanium, aluminum, or some other suitable material.

In this illustrative example, spring clamp 238 is located below and attached to support plate 236 and rests on filter 234. Spring clamp 238 is configured to deform to provide the desired preload. Spring clamp 238 allows filter 234 and housing 232 to expand and contract relative to one another without damaging either component.

In this depicted example, thermal isolator 240 is a structure positioned between sensor 214 and lower face 244 of housing 232. Thermal isolator 240 is configured to reduce conduction between sensor 214 and housing 232 and prevent heat damage to sensor 214. Thermal isolator 240 may be comprised of a material selected from at least one of ceramic, high temperature polymer, or other suitable materials.

In this depicted example, tabs 246 protrude from housing 232. Tabs 246 are configured to attach housing 232 to number of support brackets 242. Tabs 246 may be formed as part of housing 232 or attached to housing 232 post-production.

In this illustrative example, sensor housing assembly 216 also comprises layer of protective material 252 between filter 234 and spring clamp 238. Layer of protective material 252 is configured to reduce damage to filter 234 during thermal expansion. Layer of protective material 252 may take the form of a scratch guard or wear guard and may be comprised of metal material such as, for example, without limitation, titanium, aluminum, or some other suitable metal material.

Although the illustrative embodiments are described with reference to hypersonic vehicle 200, window system 202 may be applicable to other types of platforms that experience such temperatures. For example, without limitation, window system 202 may be implemented in a mobile platform, a stationary platform, a land-based structure, or a space-based structure. More specifically, the platform may be a spacecraft, a space station, a satellite, a power plant, or some other suitable platforms.

With an illustrative embodiment, window system 202 allows independent thermal expansion of facesheet 222, insulating material 224, aeroshell 206, and sensor housing assembly 216 at temperatures 207. Materials with different coefficients of thermal expansion may be used and integrated with the disclosed embodiments, unlike currently contemplated solutions. Moreover, transmissive window 218 is configured to operate at an insertion loss of less than one decibel at temperatures 207, providing improved performance for sensor 214 in hypersonic vehicle 200 over existing assembly solutions.

Figure 3:
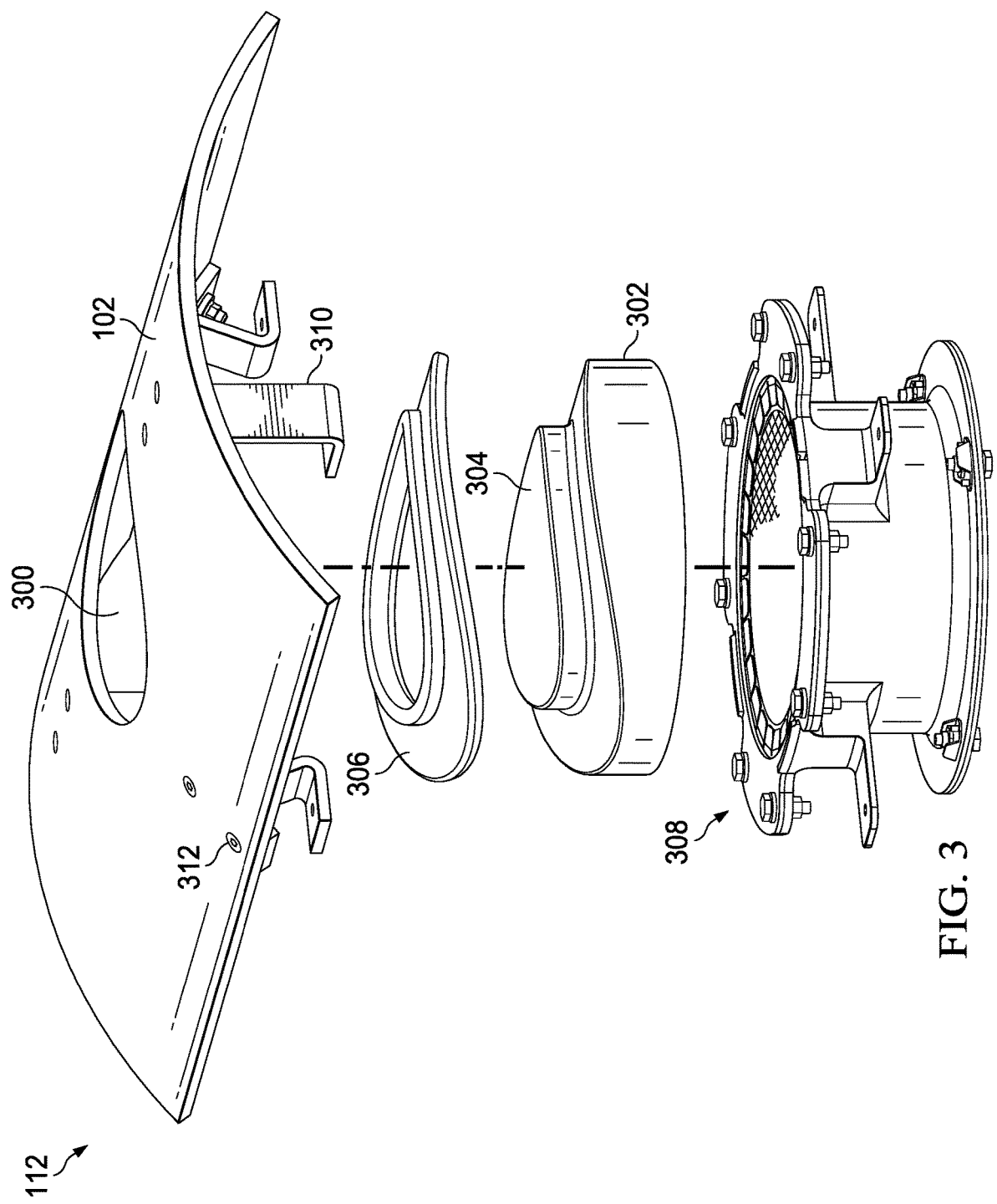
FIG. 3 is an illustration of an exploded view of a window system for a hypersonic aircraft in accordance with an illustrative embodiment.

With reference next to FIG. 3, an illustration of an exploded view of a window system for a hypersonic aircraft is depicted in accordance with an illustrative embodiment. The components illustrated in FIG. 3 are examples of physical implementations for components in window system 202 shown in block for in FIG. 2. Window system 112 from section 114 of hypersonic aircraft 100 is shown in greater detail in this view.

As illustrated, hole 300 in aeroshell 102 is configured to receive transmissive window 302. Step 304 in transmissive window 302 allows thermal seal 306 to interface with both transmissive window 302 and aeroshell 102 in a desired manner to substantially reduce hot gas flow.

In this illustrative example, sensor housing assembly 308 interfaces with transmissive window 302. Support brackets 310 are used to secure aeroshell 102 to sensor housing assembly 308. Support brackets 310 connect to aeroshell 102 using fasteners 312. Support brackets 310 have flanges configured to attach the housing to support brackets 310.

Figure 4:
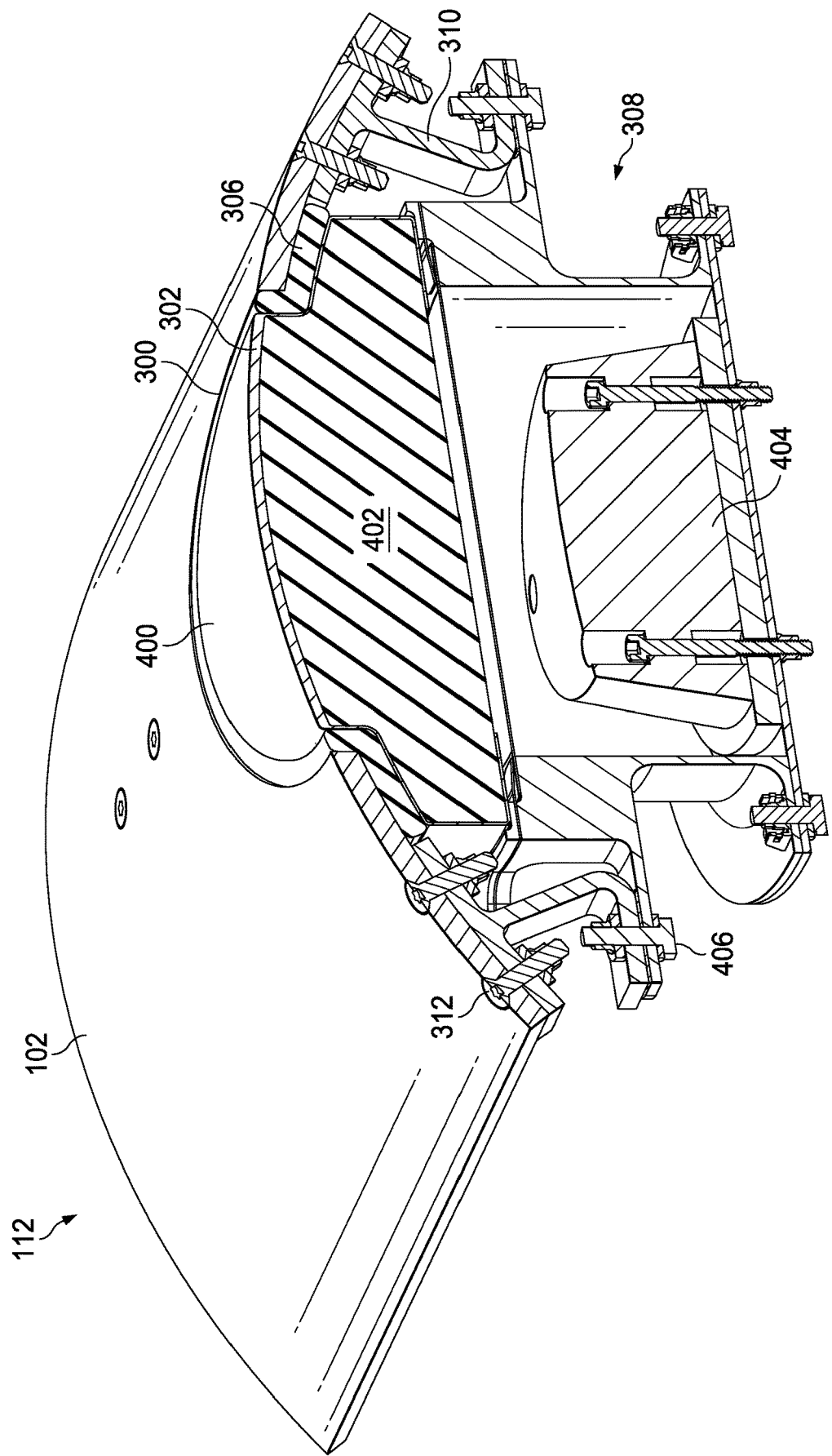
FIG. 4 is an illustration of a cross-sectional view of a window system for a hypersonic aircraft in accordance with an illustrative embodiment.

Turning now to FIG. 4, an illustration of a cross-sectional view of a window system for a hypersonic aircraft is depicted in accordance with an illustrative embodiment. This cross-sectional view of window system 112 is shown in the direction of lines 4-4 in FIG. 1. The components illustrated in FIG. 4 are examples of physical implementations for components in window system 202 shown in block for in FIG. 2.

As depicted, transmissive window 302 has facesheet 400 and insulating material 402. The thickness of insulating material 402 is selected to provide a desired level of protection for sensor 404 in sensor housing assembly 308.

In this view, support brackets 310 have been secured to sensor housing assembly 308 with fasteners 406. The tightening of fasteners 312 and fasteners 406 pressure seals transmissive window 302 and thermal seal 306 to aeroshell 102. The shape of support brackets 310 on each side of transmissive window 302 is selected to provide a desired level of flexure during the thermal expansion that occurs during hypersonic flight conditions.

Figure 5:
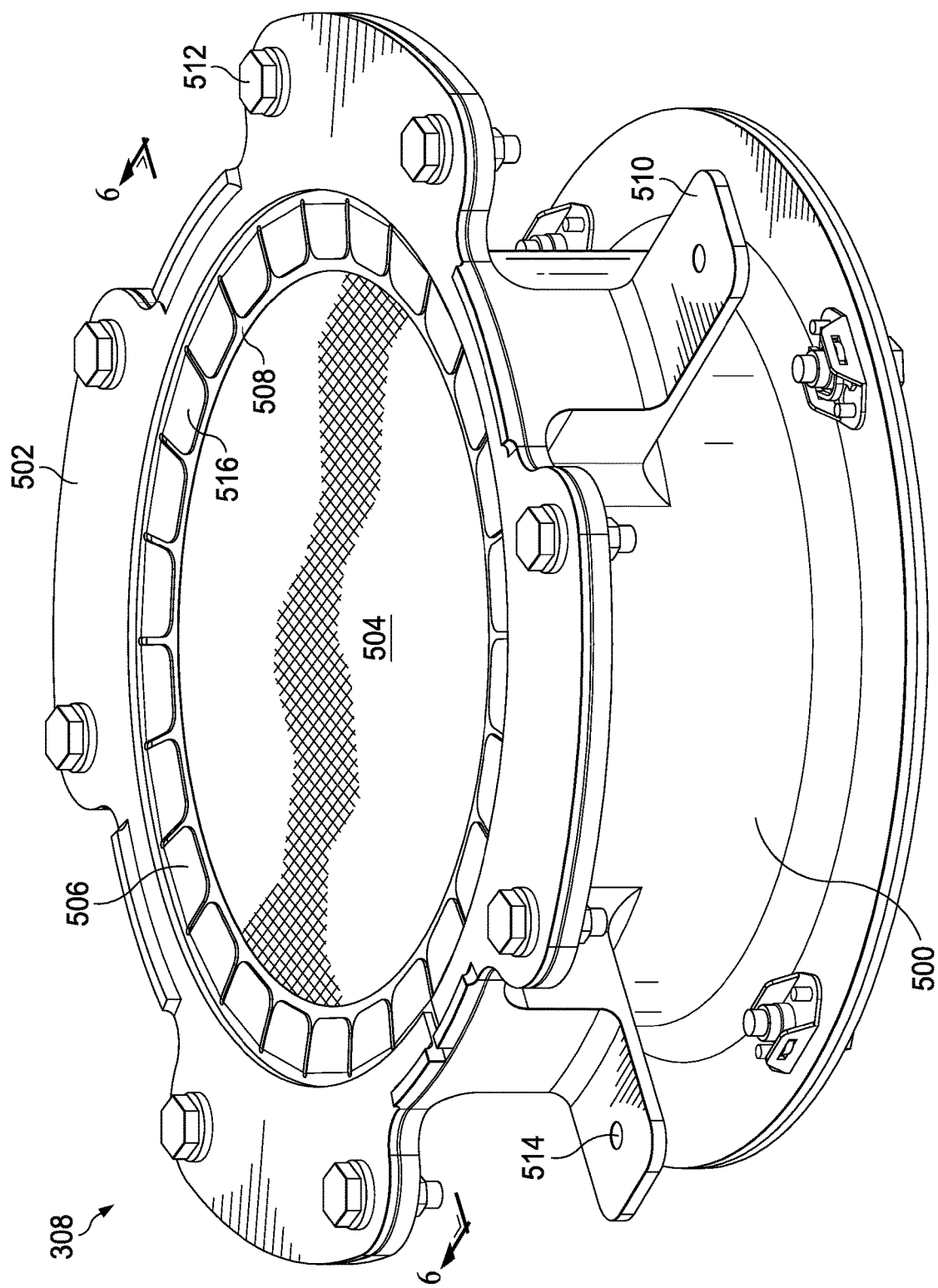
FIG. 5 is an illustration of a sensor housing assembly for a hypersonic aircraft in accordance with an illustrative embodiment.

In FIG. 5, an illustration of a sensor housing assembly for a hypersonic aircraft is depicted in accordance with an illustrative embodiment. The components illustrated in FIG. 5 are examples of physical implementations for components in sensor housing assembly 216 shown in block for in FIG. 2.

In this illustrative example, sensor housing assembly 308 has housing 500, support plate 502, filter 504, spring clamp 506, scratch guard 508, and tabs 510. Support plate 502 is secured to housing 500 using bolts 512 in various places along the perimeter of the upper portion of housing 500.

As depicted, tabs 510 have holes 514 configured to receive fasteners 406 shown in FIG. 4. Additional tabs 510 may be located around the circumference of sensor housing assembly 308 to attach housing 500 to aeroshell 102 from FIG. 4 in a desired manner.

In this illustrative example, spring clamp 506 has petals 516. Petals 516 are configured to provide the desired level of spring load for the system. Scratch guard 508, located between filter 504 and spring clamp 506, serves as a protective barrier for filter 504.

Figure 6:
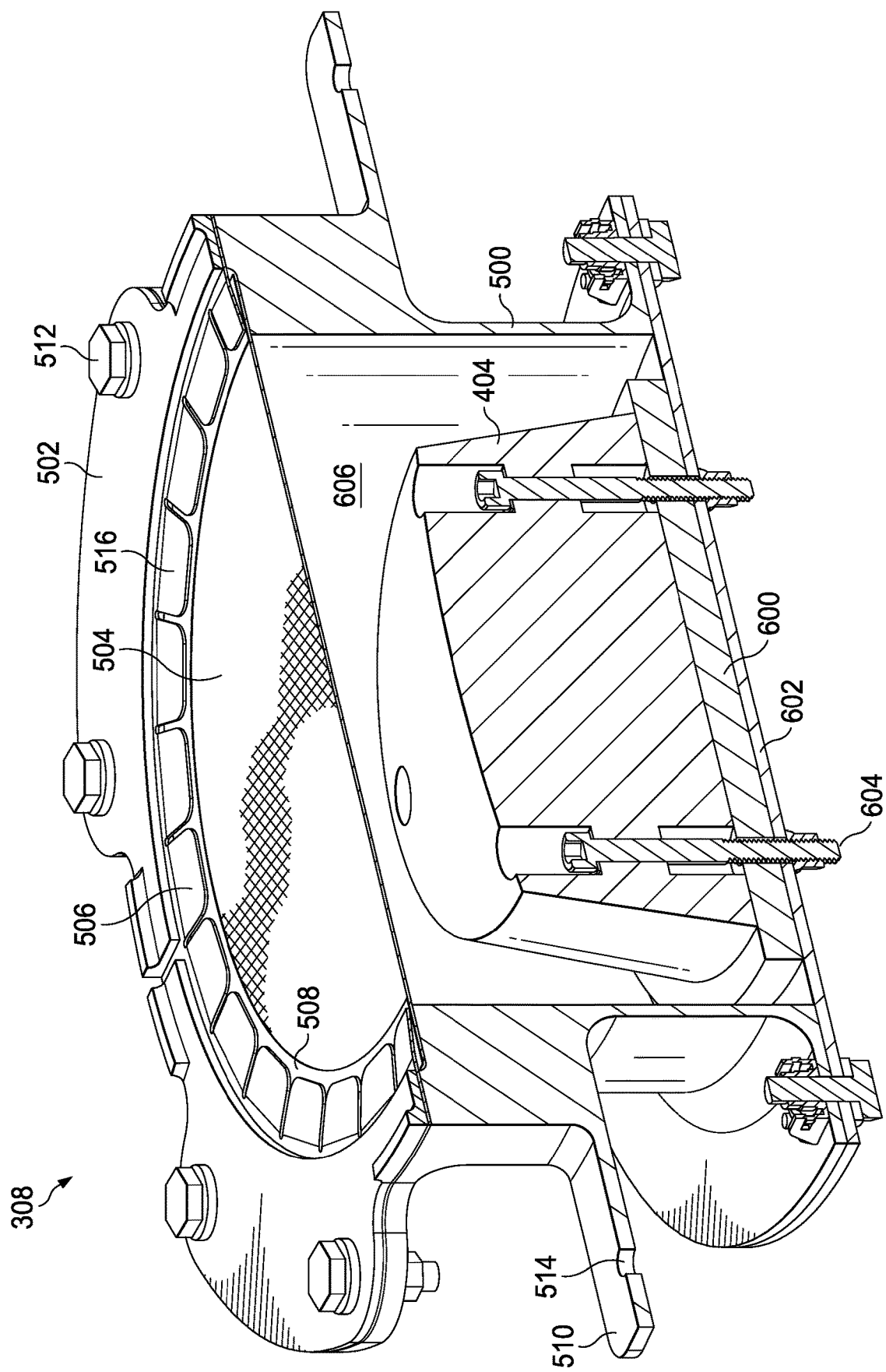
FIG. 6 is an illustration of a cross-sectional view of a sensor housing assembly for a hypersonic aircraft in accordance with an illustrative embodiment.

FIG. 6 is an illustration of a cross-sectional view of a sensor housing assembly for a hypersonic aircraft depicted in accordance with an illustrative embodiment. This cross-sectional view of sensor housing assembly 308 is shown in the direction of lines 6-6 in FIG. 5. The components illustrated in FIG. 6 are examples of physical implementations for components in sensor housing assembly 216 shown in block for in FIG. 2.

As illustrated, thermal isolator 600 is shown between sensor 404 and base cover 602 of housing 500. Sensor 404 and thermal isolator 600 are secured to base cover 602 of housing 500 with fasteners 604. Volume 606 exists within housing 500 and surrounds sensor 404. Signals are transmitted and received by sensor 404 after being filtered by filter 504 in a desired manner.

In FIG. 7, an illustration of an exploded view of a sensor housing assembly for a hypersonic aircraft is depicted in accordance with an illustrative embodiment. In this illustrative example, an exploded view of sensor housing assembly 308 is shown such that its components can be seen in greater detail.

In this illustrative example, housing 500 has upper face 700 and base cover 602 (lower face). Upper face 700 has opening 702. Filter 504 covers opening 702 in housing 500.

The different components shown in FIG. 1 and FIGS. 3-7 may be combined with components in FIG. 2, used with components in FIG. 2, or a combination of the two. Additionally, some of the components in FIG. 1 and FIGS. 3-7 may be illustrative examples of how components shown in block form in FIG. 2 may be implemented as physical structures.

Other configurations of window system 202 may be implemented other than those shown in FIG. 1 and FIGS. 3-7. The configurations described herein are not meant to be limiting as to the placement, orientation, type, or configuration of any component in hypersonic vehicle 200.

Figure 8:
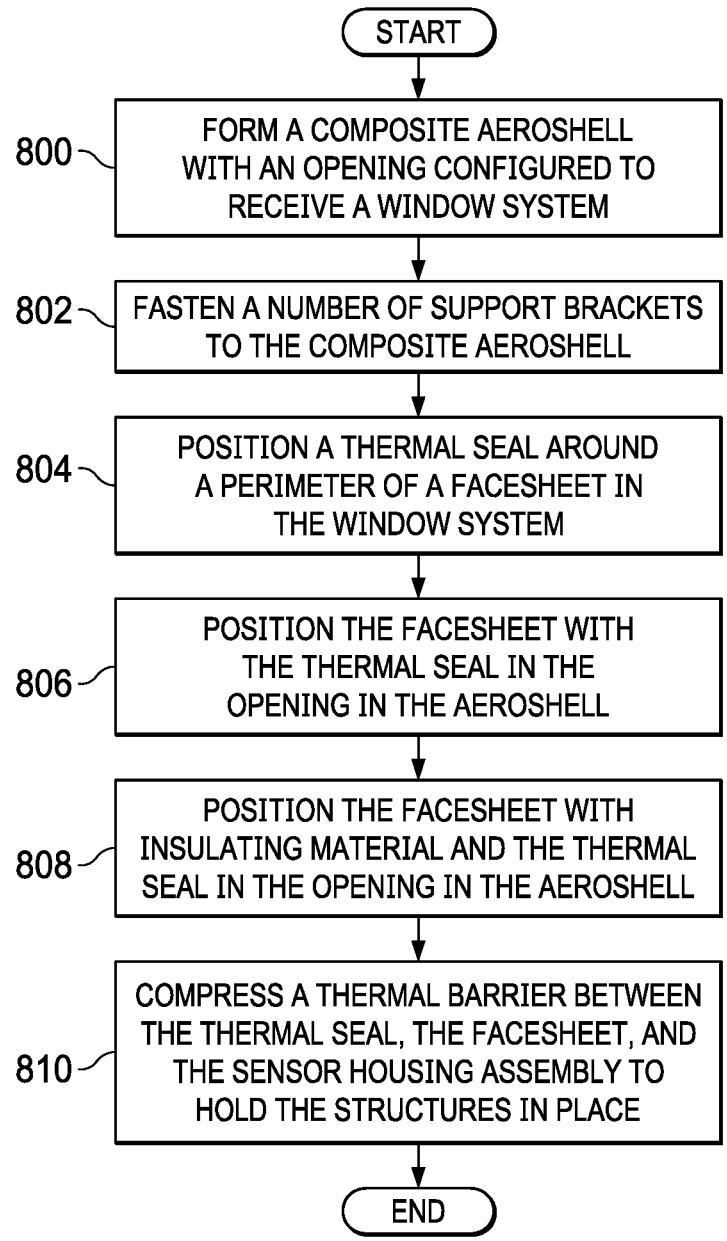
FIG. 8 is an illustration of a flowchart of a process for forming a hypersonic aircraft with a window system in accordance with an illustrative embodiment.

With reference next to FIG. 8, an illustration of a flowchart of a process for forming a hypersonic aircraft with a window system is depicted in accordance with an illustrative embodiment. The method depicted in FIG. 8 may be used to form hypersonic aircraft 204 with window system 202 in FIG. 2.

The process begins by forming a composite aeroshell with an opening configured to receive the window system (operation 800). The window system comprises a transmissive window having a facesheet and insulating material, and is radio-frequency transparent at temperatures associated with hypersonic speeds. Next, a number of support brackets is fastened to the composite aeroshell (operation 802). A thermal seal is positioned around a perimeter of a facesheet (operation 804). The facesheet with the thermal seal is positioned in the opening in the aeroshell (operation 806).

Next, a sensor housing assembly is fastened to the number of support brackets (operation 808). The sensor housing assembly comprises housing 232, filter 234, support plate 236, spring clamp 238, thermal isolator 240, and layer of protective material 252 as described with reference to FIG. 2.

As fasteners tighten the brackets, a thermal barrier between the thermal seal, the facesheet with the insulating material, and the sensor housing assembly is compressed to hold the structures in place (operation 810), with the process terminating thereafter. After installation of window system 202 in this manner, window system 202 operates at a desired insertion loss at temperatures 207.

Figure 9:
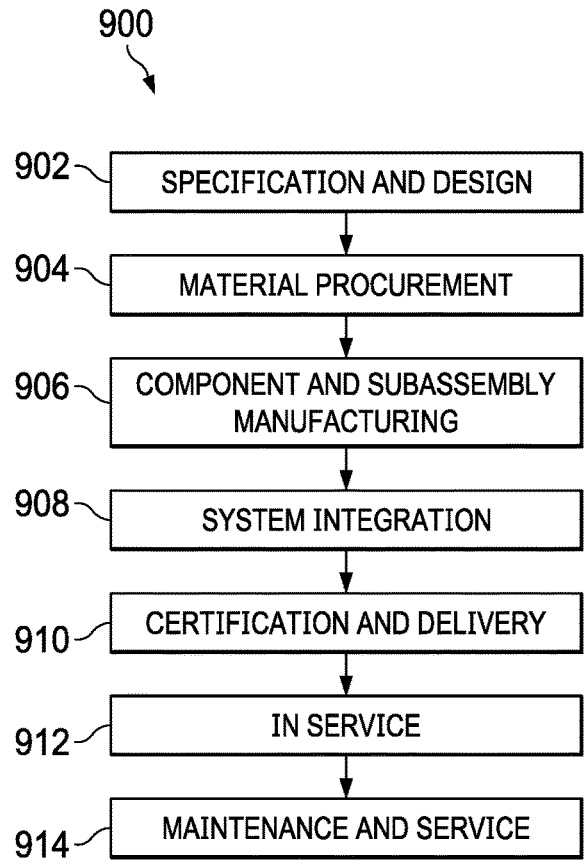
FIG. 9 is an illustration of a block diagram of an aircraft manufacturing and service method in accordance with an illustrative embodiment.
Figure 10:
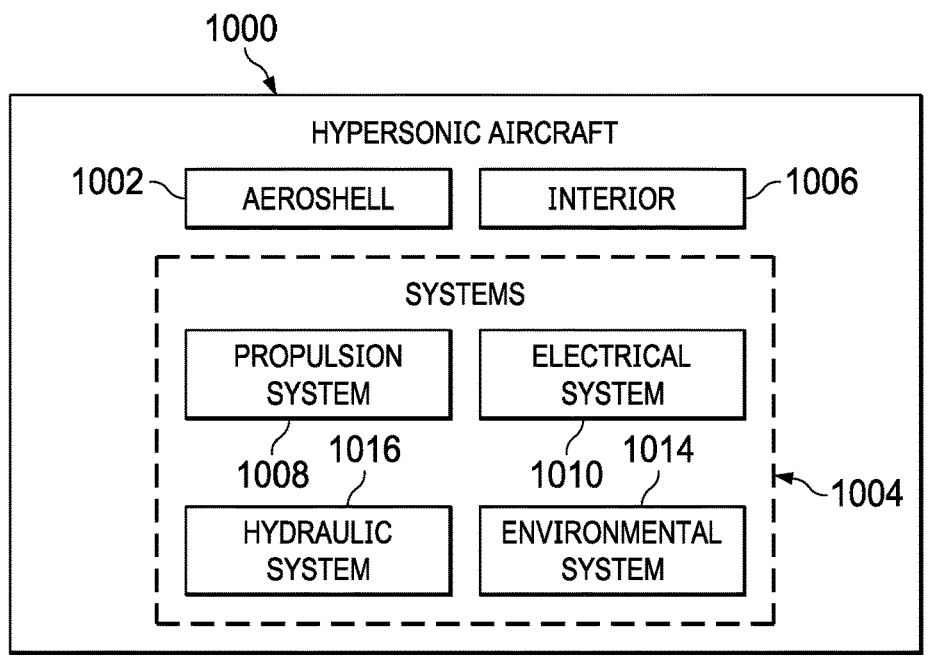
FIG. 10 is an illustration of a block diagram of an aircraft in which an illustrative embodiment may be implemented.

The illustrative embodiments of the disclosure may be further described in the context of aircraft manufacturing and service method 900 as shown in FIG. 9 and hypersonic aircraft 1000 as shown in FIG. 10. Turning first to FIG. 9, an illustration of a block diagram of an aircraft manufacturing and service method is depicted in accordance with an illustrative embodiment. During pre-production, aircraft manufacturing and service method 900 may include specification and design 902 of hypersonic aircraft 1000 in FIG. 10 and material procurement 904.

During production, component and subassembly manufacturing 906 and system integration 908 of hypersonic aircraft 1000 in FIG. 10 takes place. Thereafter, hypersonic aircraft 1000 in FIG. 10 may go through certification and delivery 910 in order to be placed in service 912. While in service 912 by a customer, hypersonic aircraft 1000 in FIG. 10 is scheduled for routine maintenance and service 914, which may include modification, reconfiguration, refurbishment, and other maintenance, service, or inspection.

Window system 112 may be installed on a hypersonic aircraft during component and subassembly manufacturing 906. In addition, a signal transmission system may be removed and window system 112 may be retrofitted onto hypersonic aircraft 1000 during routine maintenance and service 914 as part of a modification, reconfiguration, or refurbishment of hypersonic aircraft 1000 in FIG. 10.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 10, an illustration of a block diagram of an aircraft is depicted in which an illustrative embodiment may be implemented. In this example, hypersonic aircraft 1000 is produced by aircraft manufacturing and service method 900 in FIG. 9 and may include aeroshell 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In one illustrative example, components or subassemblies produced in component and subassembly manufacturing 906 in FIG. 9 may be fabricated or manufactured in a manner similar to components or subassemblies produced while hypersonic aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while hypersonic aircraft 1000 is in service 912, during maintenance and service 914, inclusive of inspection, in FIG. 9, or both. The use of a number of the different illustrative embodiments may substantially expedite the assembly of hypersonic aircraft 1000, reduce the cost of hypersonic aircraft 1000, or both expedite the assembly of hypersonic aircraft 1000 and reduce the cost of hypersonic aircraft 1000.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A window system for a hypersonic vehicle comprising:
a transmissive window comprising:
a facesheet positioned within an opening in an aeroshell of the hypersonic vehicle; and
insulating material adjacent to the facesheet, wherein the insulating material is co-processed with the facesheet;
a thermal seal surrounding a perimeter of the facesheet and sealing the facesheet and the aeroshell;
a sensor; and
a sensor housing assembly enclosing the sensor;
wherein the sensor housing assembly comprises:
a housing having an external opening;
a filter between the transmissive window and the sensor and configured to cover the external opening of the housing;
a support plate attached to the housing; and
a spring clamp secured between the support plate and the filter and configured to allow the filter and the housing to expand and contract relative to one another;
wherein the transmissive window is radio-frequency transparent at temperatures associated with hypersonic speeds.

2. The window system of claim 1, wherein the sensor housing assembly further comprises:
a thermal isolator between the sensor and the housing and configured to reduce conduction between the sensor and the housing.

3. The window system of claim 2, wherein the sensor housing assembly further comprises:
a number of support brackets attaching the housing to the aeroshell.

4. The window system of claim 3, wherein the housing comprises:
tabs configured to attach to the number of support brackets.

5. The window system of claim 3, wherein the number of support brackets are fastened to the aeroshell using ceramic fasteners.

6. The window system of claim 3, wherein the sensor housing assembly further comprises:
a layer of protective material between the filter and the spring clamp configured to reduce damage to the filter during thermal expansion.

7. The window system of claim 1, wherein the window system allows independent thermal expansion of the facesheet, the insulating material, the aeroshell and the sensor housing assembly at the temperatures associated with the hypersonic speeds.

8. The window system of claim 1, wherein the facesheet comprises an oxide ceramic matrix composite;
the insulating material comprises low-density ceramic material; and
the facesheet and the insulating material are configured to operate at an insertion loss of less than one decibel with a dielectric constant of 5 or less and a tangent loss of 0.01 or less at the hypersonic speeds.

9. A method for forming a hypersonic aircraft, the method comprising:
forming an aeroshell with an opening configured to receive a window system;
fastening a number of support brackets to the aeroshell;
positioning a thermal seal around a perimeter of a transmissive window in the window system, wherein the transmissive window comprises a facesheet and insulating material;
positioning the transmissive window and the thermal seal in the opening in the aeroshell;
fastening a sensor housing assembly to the number of support brackets;
attaching a support plate to a housing in the sensor housing assembly, wherein the support plate is located between the insulating material and the housing; and
securing a spring clamp between the support plate and a filter, wherein the spring clamp is configured to allow the filter and the housing to expand and contract relative to one another;
wherein the transmissive window is radio-frequency transparent at temperatures associated with hypersonic speeds.

10. The method of claim 9:
wherein fastening the sensor housing assembly to the number of support brackets comprises tightening fasteners between the sensor housing assembly and the number of support brackets to pressure seal the transmissive window and the thermal seal to the aeroshell.

11. The method of claim 9 further comprising:
positioning a sensor within the housing;
positioning a thermal isolator between the sensor and the housing to reduce conduction between the sensor and the housing; and
securing the sensor to the housing with fasteners.

12. The method of claim 11 further comprising:
co-processing the facesheet and the insulating material, wherein the facesheet comprises an oxide ceramic matrix composite material, the insulating material comprises a low-density ceramic material, and the facesheet and the insulating material are configured to operate with a dielectric constant of 5 or less and a tangent loss of 0.01 or less at the hypersonic speeds.

13. A hypersonic aircraft comprising:
a composite aeroshell;
an opening in the composite aeroshell; and
a window system comprising:
a transmissive window comprising:
a facesheet positioned within the opening; and
insulating material adjacent to the facesheet, wherein the insulating material is co-processed with the facesheet;
a thermal seal surrounding a perimeter of the facesheet and sealing the facesheet and the composite aeroshell;
a sensor; and
a sensor housing assembly enclosing the sensor;
wherein the sensor housing assembly comprises:
a housing having an external opening;
a filter between the transmissive window and the sensor and configured to cover the external opening of the housing;
a support plate attached to the housing; and
a spring clamp attached to the support plate and filter and configured to allow the filter and the housing to expand and contract relative to one another;
wherein the transmissive window is configured to operate at an insertion loss of less than one decibel at temperatures associated with hypersonic speeds.

14. The hypersonic aircraft of claim 13, wherein the sensor housing assembly further comprises:
a layer of protective material between the filter and the spring clamp and configured to reduce damage to the filter during thermal expansion.

15. The hypersonic aircraft of claim 14, wherein the sensor housing assembly further comprises:
a thermal isolator between the sensor and the housing and configured to reduce conduction between the sensor and the housing.

16. The hypersonic aircraft of claim 14, wherein the sensor housing assembly further comprises:
a number of support brackets attaching the housing to the composite aeroshell; and
flanges configured to attach the housing to the number of support brackets.

17. The hypersonic aircraft of claim 14, wherein the window system allows independent thermal expansion of the facesheet, the insulating material, the composite aeroshell and the sensor housing assembly at the temperatures associated with the hypersonic speeds.

18. The hypersonic aircraft of claim 13, wherein the sensor housing assembly further comprises:
a number of support brackets attaching the housing to the aeroshell.

19. The hypersonic aircraft of claim 18, wherein the housing comprises:
tabs configured to attach to the number of support brackets.

20. The hypersonic aircraft of claim 18, wherein the number of support brackets are fastened to the aeroshell using ceramic fasteners.

* * * * *